(12) United States Patent
Groves et al.

(10) Patent No.: US 10,365,669 B2
(45) Date of Patent: Jul. 30, 2019

(54) SYSTEMS AND METHODS FOR FLUID REGULATION

(71) Applicant: THE OILGEAR COMPANY, Traverse City, MI (US)

(72) Inventors: Frank Groves, Bend, OR (US); Josh Groves, Traverse City, MI (US); Tyler Zawacki, Traverse City, MI (US)

(73) Assignee: THE OILGEAR COMPANY, Traverse City, MI (US)

( * ) Notice: Subject to any disclaimer, the term of this patent is extended or adjusted under 35 U.S.C. 154(b) by 178 days.

(21) Appl. No.: 15/268,369

(22) Filed: Sep. 16, 2016

(65) Prior Publication Data

US 2017/0083030 A1  Mar. 23, 2017

Related U.S. Application Data

(63) Continuation-in-part of application No. 14/857,853, filed on Sep. 18, 2015.

(60) Provisional application No. 62/220,272, filed on Sep. 18, 2015.

(51) Int. Cl.
*F16K 17/04* (2006.01)
*G05D 16/04* (2006.01)

(52) U.S. Cl.
CPC ............ *G05D 16/04* (2013.01); *F16K 17/048* (2013.01)

(58) Field of Classification Search
CPC ........ F16K 11/04; F16K 15/028; F16K 25/05; F16K 27/029; F16K 17/048; G05D 16/04; E21B 33/0355; E21B 34/04; E21B 33/064

USPC .................................................. 137/505–510
See application file for complete search history.

(56) References Cited

U.S. PATENT DOCUMENTS

| | | | |
|---|---|---|---|
| 2,722,234 A | 11/1955 | MacGeorge et al. | |
| 2,827,069 A * | 3/1958 | Peterson | G05D 16/0683 137/116.5 |
| 2,913,005 A | 11/1959 | Grant et al. | |
| 3,329,165 A | 7/1967 | Lang | |
| 3,381,710 A | 5/1968 | Hribar et al. | |
| 3,765,449 A * | 10/1973 | Cole | F01L 23/00 137/596.12 |

(Continued)

*Primary Examiner* — Jessica Cahill
(74) *Attorney, Agent, or Firm* — David G. Woodral; GableGotwals

(57) ABSTRACT

Systems, methods, and apparatuses for a regulator are provided. The regulator includes a reducing valve, an accumulator, an accumulator line, and a regulated line. The reducing valve is operable between a closed position and an open position. The reducing valve includes a first opening inlet configured to receive fluid to bias the reducing valve towards the open position, a first closing inlet configured to receive fluid to bias the reducing valve towards the closed position, and a first spring configured to transmit a first spring force to the reducing valve to bias the reducing valve towards the closed position. The accumulator is configured to store fluid at a first pressure. The accumulator line is configured to receive fluid from the accumulator and to provide the fluid to the first opening inlet at the first pressure. The regulated line is connected to the first closing inlet at a second pressure. The reducing valve transitions from the closed position to the open position when a first force created by the first pressure on the reducing valve is greater than a sum of the first spring force, a first tolerance, and a second force created by the second pressure on the reducing valve.

10 Claims, 1 Drawing Sheet

(56) References Cited

U.S. PATENT DOCUMENTS

| | | | | |
|---|---|---|---|---|
| 3,805,837 | A | 4/1974 | Stampfli | |
| 3,850,273 | A * | 11/1974 | Murakami | B60T 11/103 |
| | | | | 137/505.15 |
| 3,921,660 | A | 11/1975 | Kowalski | |
| 3,993,100 | A | 11/1976 | Pollard et al. | |
| 4,095,421 | A | 6/1978 | Silcox | |
| 4,150,687 | A | 4/1979 | Blanton | |
| 4,185,652 | A | 1/1980 | Zintz et al. | |
| 4,198,820 | A * | 4/1980 | Roth | F04B 47/04 |
| | | | | 417/904 |
| 4,393,751 | A | 7/1983 | Kelley | |
| 4,467,825 | A | 8/1984 | Boyd | |
| 4,493,335 | A | 1/1985 | Watson | |
| 4,497,369 | A | 2/1985 | Hurta et al. | |
| 4,706,932 | A | 11/1987 | Yoshida et al. | |
| 4,777,800 | A | 10/1988 | Hay, II | |
| 4,796,428 | A * | 1/1989 | Hall | B21J 7/24 |
| | | | | 60/413 |
| 4,880,033 | A | 11/1989 | Neff | |
| 4,915,134 | A | 4/1990 | Toliusis et al. | |
| 4,955,195 | A | 9/1990 | Jones et al. | |
| 5,518,030 | A | 5/1996 | Liu et al. | |
| 5,778,918 | A | 7/1998 | McLelland | |
| 5,878,647 | A | 3/1999 | Wilke et al. | |
| 5,901,749 | A | 5/1999 | Watson | |
| 6,192,680 | B1 | 2/2001 | Brugman et al. | |
| 6,655,405 | B2 | 12/2003 | Hollister et al. | |
| 6,779,543 | B2 | 8/2004 | Hollister et al. | |
| 7,243,671 | B2 | 7/2007 | Thrash et al. | |
| 7,520,129 | B2 | 4/2009 | Springett | |
| 7,520,297 | B2 | 4/2009 | Bell et al. | |
| 7,757,772 | B2 | 7/2010 | Donohue et al. | |
| 7,921,880 | B2 | 4/2011 | Jackson et al. | |
| 8,210,201 | B2 * | 7/2012 | Fowler | F16K 35/02 |
| | | | | 137/489.5 |
| 8,282,020 | B2 | 10/2012 | Kiss et al. | |
| 8,469,048 | B2 | 6/2013 | Bresnahan | |
| 8,490,705 | B2 | 7/2013 | Curtiss, III | |
| 2004/0261859 | A1 * | 12/2004 | Callies | F16K 17/0413 |
| | | | | 137/495 |
| 2007/0251588 | A1 | 11/2007 | Linder et al. | |
| 2007/0267076 | A1 | 11/2007 | Strauss et al. | |
| 2008/0223467 | A1 | 9/2008 | Tveita | |
| 2012/0279720 | A1 | 11/2012 | Whitby et al. | |
| 2014/0000902 | A1 * | 1/2014 | Wolfe | E21B 33/063 |
| | | | | 166/361 |
| 2014/0061516 | A1 | 3/2014 | Gustafson et al. | |

* cited by examiner

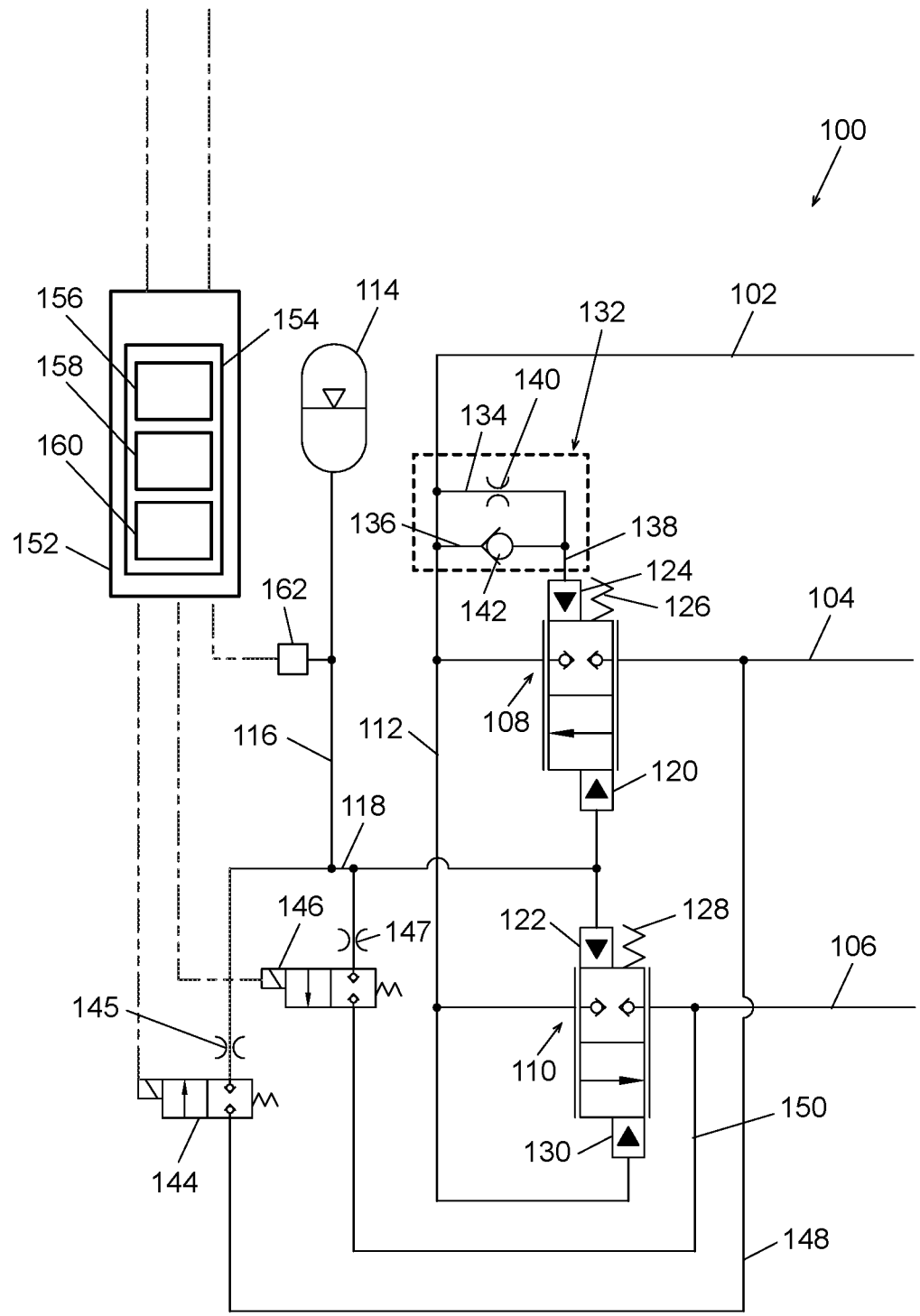

SYSTEMS AND METHODS FOR FLUID REGULATION

CROSS-REFERENCE TO RELATED APPLICATIONS

This application is a continuation-in-part of U.S. patent application Ser. No. 14/857,853, filed Sep. 18, 2015. This application also claims the benefit of, and priority to, U.S. Provisional Patent Application No. 62/220,272, filed Sep. 18, 2015. Both U.S. patent application Ser. No. 14/857,853 and U.S. Provisional Patent Application No. 62/220,272 are hereby incorporated by reference herein in their entireties.

TECHNICAL FIELD

Embodiments of the present disclosure relate to systems and methods for fluid regulation.

BACKGROUND

In many applications, regulation (e.g., control) of a pressure of fluid is desired. Typically, this regulation is obtained through the use of a regulator (e.g., pressure regulator, etc.). Regulators may be used in any number of applications, including subsea (e.g., underwater, etc.) applications. For example, regulators may be utilized in blowout preventers (BOPs), remotely operated vehicles (ROVs), and fixed manifold control pressure applications. Regulators control a pressure of regulated fluid (e.g., hydraulic fluid, etc.) through the use of a supply of fluid and a vent. Typically, regulators bias a diaphragm to cause the regulated fluid to flow through the regulator, thereby decreasing the pressure of the regulated fluid at the regulator.

Conventional regulators are typically of the shear-seal valve type and include a main spring pack that is compensated to ambient pressure. As a result of the shear-seal design, conventional regulators are subject to relatively high friction forces which produce an undesirably large hysteresis. Conventional regulators lack a damping mechanism making the regulators prone to violent oscillations in demanding applications. Conventional regulators are also prone to flow inefficiency as a function of overall size of the regulator. This requires conventional regulators to have a large overall size for many typical applications. Accordingly, reducing these shortcomings is of paramount importance in the design of new regulators.

SUMMARY

Systems, methods, and apparatuses for a regulator are provided. One embodiment relates to a regulator. The regulator includes a reducing valve, an accumulator, an accumulator line, and a regulated line. The reducing valve is operable between a closed position and an open position. The reducing valve includes a first opening inlet configured to receive fluid to bias the reducing valve towards the open position, a first closing inlet configured to receive fluid to bias the reducing valve towards the closed position, and a first spring configured to transmit a first spring force to the reducing valve to bias the reducing valve towards the closed position. The accumulator is configured to store fluid at a first pressure. The accumulator line is configured to receive fluid from the accumulator and to provide the fluid to the first opening inlet at the first pressure. The regulated line is connected to the first closing inlet at a second pressure. The reducing valve transitions from the closed position to the open position when a first force created by the first pressure on the reducing valve is greater than a sum of the first spring force, a first tolerance, and a second force created by the second pressure on the reducing valve.

Another embodiment relates to a regulator. The regulator includes a reducing valve, a relief valve, and an accumulator. The reducing valve is configured to selectively route fluid from a supply line to a regulated line. The relief valve is configured to selectively route fluid from the regulated line to a vent line. The accumulator is configured to route fluid to the reducing valve and the relief valve.

Yet another embodiment relates to a regulator. The regulator includes a reducing valve and a speed control network. The reducing valve is configured to selectively route fluid from a supply line to a regulated line. The reducing valve includes a first closing inlet. The speed control network is connected to the regulated line and to the first closing inlet. The speed control network includes a first branch and a second branch. The first branch is configured to facilitate transmission of fluid between the regulated line and the first closing inlet. The first branch includes a constriction configured to reduce a flow rate of fluid through the constriction. The second branch is configured to facilitate transmission of fluid between the regulated line and the first closing inlet. The second branch includes a check valve configured to facilitate transmission of fluid from the regulated line to the first closing inlet. The check valve is additionally configured to substantially prohibit transmission of fluid from the first closing inlet to the regulated line.

These and other features, together with the organization and manner of operation thereof, may become apparent from the following detailed description when taken in conjunction with the accompanying drawings.

BRIEF DESCRIPTION OF THE FIGURES

FIG. 1 is a schematic illustration of a regulator for a fluid regulation system, according to an exemplary embodiment.

DETAILED DESCRIPTION

Referring to the FIGURES generally, systems, methods, and apparatuses for a valve assembly are provided herein.

Referring to FIG. 1, a regulator, depicted as regulator 100, is shown connected to a first fluid line, shown as regulated line 102 (e.g., conduit, pipe, etc.), a second fluid line, shown as supply line 104 (e.g., conduit, pipe, etc.), and a third fluid line, shown as vent line 106 (e.g., conduit, pipe, etc.). Regulator 100 may be utilized in offshore or subsea (e.g., underwater, etc.) applications where regulated fluid pressure is required. For example, regulator 100 may be implemented in a ROV, may be implemented to control important BOP functions (e.g., deadman switch, auto shear, ram shear, etc.), or may be implemented in subsea manifolds or other subsea applications. In various applications, regulator 100 receives fluid from a high pressure source, such as an accumulator bank or pumping station, which requires a reducing in pressure for a control manifold, seal test, or other purpose.

Regulator 100 may be utilized both to reduce pressure and to relieve pressure in a system. In some applications, regulator 100 reduces oscillation and overshoot that occurs in conventional regulators due to inertial mass and friction. Regulator 100 may also facilitate decreased flow forces compared to those observed in conventional regulators. In conventional regulators, these flow forces cause inaccuracy of the regulators. Further, regulator 100 may also facilitate increased flow efficiency and decreased response times compared to conventional regulators.

According to an exemplary embodiment, regulated line 102 selectively provides or supplies fluid (e.g., hydraulic fluid, etc.) at a regulated pressure from regulator 100 to a BOP. Regulated line 102 may contain fluid at various pressures, including a pressure equal to ambient pressure (e.g., ambient water pressure, etc.). Regulator 100 is configured to (e.g., capable of, structured to, etc.) selectively receive fluid via supply line 104 from a fluid supply such as a high pressure source (e.g., accumulator bank, pumping station, etc.). Supply line 104 may contain fluid at various pressures, including a pressure equal to ambient water pressure. In various embodiments, regulator 100 is configured to (e.g., capable of, structured to, etc.) selectively discharge fluid via vent line 106 to an external reservoir (e.g., environment, conduit, container, etc.).

Regulator 100 includes a first valve, shown as reducing valve 108 (e.g., two-position, two-way valve, etc.), and a second valve, shown as relief valve 110 (e.g., two-position, two-way valve, etc.). Reducing valve 108 receives fluid from supply line 104 and is configured to (e.g., capable of, structured to, etc.) selectively provide fluid to a fourth line, shown as common regulated line 112 (e.g., conduit, pipe, etc.). In some embodiments, common regulated line 112 is integrated within regulated line 102. In other embodiments, common regulated line 112 is fluidly connected to (e.g., fluidly communicable with, fluidly coupled to, etc.) regulated line 102. Reducing valve 108 is progressively operable between a closed position, where no fluid is provided through reducing valve 108, and an open position, where fluid is provided from supply line 104 to common regulated line 112 through reducing valve 108.

Relief valve 110 is configured to (e.g., capable of, structured to, etc.) selectively receive fluid from common regulated line 112 and configured to (e.g., capable of, structured to, etc.) selectively provide fluid to vent line 106. According to an exemplary embodiment, regulator 100 also includes an accumulator, shown as accumulator 114. Accumulator 114 is configured to (e.g., capable of, structure to, etc.) receive, store, and dispense fluid via a fifth line, shown as accumulator line 116 (e.g., conduit, pipe, etc.). Accumulator line 116 is fluidly connected to (e.g., fluidly communicable with, fluidly coupled to, etc.), a sixth line, shown as common accumulator line 118 (e.g., conduit, pipe, etc.). Relief valve 110 is progressively operable between a closed position, where no fluid is provided through relief valve 110, and an open position, where fluid is provided from common regulated line 112 to vent line 106 through relief valve 110.

According to an exemplary embodiment, common accumulator line 118 is fluidly connected to (e.g., fluidly communicable with, fluidly coupled to, etc.) an inlet, shown as opening inlet 120, of reducing valve 108, and an inlet, shown as closing inlet 122, of relief valve 110. In various embodiments, accumulator line 116 and common accumulator line 118 are configured to transfer fluid from accumulator 114 to opening inlet 120 of reducing valve 108 and closing inlet 122 of relief valve 110.

As fluid flows through opening inlet 120, reducing valve 108 is biased towards the open position by a fluid force from accumulator 114. As this fluid force increases, a fluid flow through reducing valve 108 from supply line 104 is caused to progressively increase. According to an exemplary embodiment, reducing valve 108 includes a second inlet, shown as closing inlet 124, and a biasing element, shown as spring 126. Closing inlet 124 receives fluid from common regulated line 112. As fluid flows through closing inlet 124, reducing valve 108 is biased towards the closed position by a fluid force. As this fluid force increases, fluid flow through reducing valve 108 is progressively decreased. Spring 126 cooperates with this fluid force to resist movement of reducing valve 108 to the open position.

According to various embodiments, a force balance, or lack thereof, is created between a fluid force from opening inlet 120, from accumulator 114, and a fluid force from closing inlet 124, from common regulated line 112, combined with a spring force from spring 126. This force balance may incorporate a tolerance to ensure that reducing valve 108 is desirably open or closed. In this way, force from fluid flowing from accumulator 114, through opening inlet 120, is resisted by force from fluid flowing from common regulated line 112, through closing inlet 124, combined with spring force from spring 126.

According to an exemplary embodiment, relief valve 110 includes a biasing element, shown as spring 128, and a second inlet, shown as opening inlet 130. As fluid flows through closing inlet 122, relief valve 110 is biased towards the closed position by a fluid force from accumulator 114. This fluid force is complimented by a spring force created by spring 128 that biases relief valve 110 towards the closed position thereby resisting movement of relief valve 110 to the open position. Opening inlet 130 receives fluid from common regulated line 112. As fluid flows through opening inlet 130, relief valve 110 is biased towards the open position by a fluid force. As this fluid force increases, a fluid flow through relief valve 110 is progressively increased. Typically, fluid force through opening inlet 130 increases when a pressure spike occurs in regulated line 102. In this way, common regulated line 112 can selectively vent fluid to vent line 106 when pressure in regulated line 102 becomes undesirable.

According to various embodiments, a force balance, or lack thereof, is created between a fluid force from opening inlet 130, from accumulator 114, and a fluid force from closing inlet 122, from common regulated line 112, combined with a spring force from spring 128. This force balance may incorporate a tolerance to ensure that relief valve 110 is desirably open or closed. The tolerance for relief valve 110 may be the same or different from a tolerance incorporated for reducing valve 108. In this way, force from fluid flowing from accumulator 114, through opening inlet 130, is resisted by force from fluid flowing from common regulated line 112, through closing inlet 122, combined with spring force from spring 128.

As shown in FIG. 1, common regulated line 112 is connected to a network (e.g., circuit, etc.), shown as speed control network 132. Speed control network 132 is configured to receive fluid from common regulated line 112 and to provide fluid to closing inlet 124 of reducing valve 108. According to an exemplary embodiment, speed control network 132 includes a first branch, shown as first branch 134, a second branch, shown as second branch 136, and a third branch, shown as common branch 138. First branch 134 and second branch 136 are both coupled to common regulated line 112 and to common branch 138. Common branch 138 is configured to provide fluid to closing inlet 124 of reducing valve 108.

In various embodiments, first branch 134 includes a device, shown as constriction 140 (e.g., orifice, flow restrictor, flow limiter, etc.), and second branch 136 includes a device, shown as check valve 142 (e.g., one-way valve, clack valve, non-return valve, etc.). Constriction 140 is configured to limit the flow of fluid through first branch 134 to a specified flow rate. Constriction 140 is defined by a diameter. This diameter is related to a desired amount of flow that may flow through first branch 134. In this way, constriction 140 acts as a flow restrictor. Similarly, check valve 142 is configured to selectively facilitate flow of fluid through second branch 136 to common branch 138 and eventually to closing inlet 124 of reducing valve 108. Check valve 142 is configured (e.g., structured, etc.) such that flow only occurs in one direction, from common regulated line 112 to common branch 138.

Speed control network 132 is configured to facilitate selective flow of fluid from common regulated line 112 to closing inlet 124. In this way, as pressure in common regulated line 112 increases, pressure to closing inlet 124 is correspondingly increased and thus the closing bias on reducing valve 108 is increased. By taking into account the effects of constriction 140 (e.g., the diameter of constriction 140, etc.) and check valve 142 (e.g., the flow coefficient, the cracking pressure, etc.) as well as the spring force provided by spring 126, a target pressure of accumulator 114 can be selected such that a target flow rate through reducing valve 108 and a target pressure in regulated line 102, is obtained.

Because speed control network 132 includes both constriction 140 and check valve 142, speed control network 132 impacts the transition time of reducing valve 108 from the closed position to the open position differently than the transition time of reducing valve 108 from the open position to the closed position. Constriction 140 facilitates gradually opening of reducing valve 108 such that it does not slam open. Conversely, the check valve 142 facilitates rapid closing of reducing valve 108. This rapid closing of reducing valve 108 occurs at a target pressure in common regulated line 112. At this target pressure, fluid force is dramatically and instantaneously increased on reducing valve 108, biasing reducing valve 108 towards the closed position. Simultaneously, fluid force on relief valve 110 through opening inlet 130 substantially increases. If the fluid force on relief valve 110 increases above a threshold, relief valve 110 opens and fluid is vented from common regulated line 112 to vent line 106 until pressure in common regulated line 112 is such that fluid force on relief valve 110 is below the threshold and relief valve 110 is closed.

The transition of reducing valve 108 from the closed position to the open position may occur slowly because fluid can only flow through constriction 140 once the check valve 142 is closed. In this way, the diameter of constriction 140 may largely control how quickly reducing valve 108 transitions from the closed position to the open position.

Conversely, an increase in pressure of fluid in common regulated line 112 may be mitigated, in part, via check valve 142. The transition from the open position to the closed position may occur rapidly because fluid can flow through constriction 140 and can flow through check valve 142. For example, if a pressure spike in regulated line 102 occurs, it is desirable to close reducing valve 108 rapidly to create a pressure relief in regulated line 102.

Further, when an increase in pressure of fluid in common regulated line 112 occurs, fluid force through opening inlet 130 of relief valve 110 increases. This fluid force facilitates selectively venting of common regulated line 112 through relief valve 110 and through vent line 106 when pressure is in regulated line 102 is undesirable. This allows relief valve 110 to mitigate water-hammer and undesirable pressure spikes in regulated line 102.

In some embodiments, a flow rate of fluid through constriction 140 is greater than a flow rate of fluid through check valve 142. For example, the flow rate of fluid through constriction 140 may be twice as large as the flow rate of fluid through check valve 142. In an alternative example, the flow rate of fluid through constriction 140 is half of the flow rate of fluid through check valve 142.

Other configurations of speed control network 132 are also possible. For example, speed control network 132 may include multiple constrictions and check valves. Alternatively, speed control network 132 may include several constrictions and check valves in series. For example, speed control network 132 may include a first combination of constriction and check valve for facilitating fluid flow in the open position and a second combination of constriction and check valve for facilitating fluid flow in the closed position.

Similarly, the target pressure of accumulator 114 may be selected such that a target flow rate through relief valve 110 is obtained. In this way, the target pressure of accumulator 114 may take into account the flow of fluid to opening inlet 130 via common regulated line 112 and the spring force provided by spring 128.

In order to establish the target pressure in accumulator 114, regulator 100 may utilize a first valve, shown as charging valve 144, and a second valve, shown as discharging valve 146. Charging valve 144 is coupled to a seventh line, shown as charging line 148, and common accumulator line 118. Charging line 148 is connected to, and receives fluid from, supply line 104. Charging valve 144 may be selectively operated (e.g., via electronic control, via manual control, etc.) to cause fluid to flow through charging line 148 from supply line 104 through common accumulator line 118 to accumulator 114. In this way, charging valve 144 may be operated to selectively charge (e.g., fill, etc.) accumulator 114 with fluid, thus increasing pressure in accumulator 114. According to an exemplary embodiment, charging valve 144 transmits fluid through a constriction, shown as constriction 145 (e.g., orifice, flow restrictor, etc.). Constriction 145 is configured to decrease shock to accumulator 114.

Similarly, discharging valve 146 may be utilized to decrease pressure of fluid in accumulator 114. Discharging valve 146 is coupled to an eighth line, shown as discharging line 150, and common accumulator line 118. Discharging line 150 is connected to, and transmits fluid to, vent line 106. Discharging valve 146 may be selectively operated (e.g., via electronic control, via manual control, etc.) to cause fluid to flow from accumulator 114 through discharging line 150 and to vent line 106. In this way, discharging valve 146 may be operated to selectively discharge (e.g., empty, etc.) accumulator 114 with fluid, thus decreasing pressure in accumulator 114. According to an exemplary embodiment, discharging valve 146 receives fluid through a constriction, shown as constriction 147 (e.g., flow restrictor, etc.). Constriction 147 is configured to decrease shock to accumulator 114. Through the cooperation of constriction 145 and constriction 147, less oscillation occurs when accumulator 114 is charged and discharged.

According to an exemplary embodiment, regulator 100 includes a controller, shown as controller 152. In one embodiment, controller 152 is communicable with charging valve 144 and discharging valve 146. In this way, controller 152 may control charging and discharging of accumulator 114. In an alternative embodiment, controller 152 is utilized in a manual override mode where fluid forces on reducing valve 108 through opening inlet 120 are increased by direct routing of fluid from supply line 104 through charging line 148 to reducing valve 108. For example, the manual override mode may be utilized to force open reducing valve 108 in the event that accumulator 114 fails to operate as intended or is damaged, or to immediately supplement and expedite opening of reducing valve 108.

According to various embodiments, controller 152 includes a circuit, shown as processing circuit 154, a processor within processing circuit, shown as processor 156, a memory within processing circuit 154, shown as memory 158, and a circuit within processing circuit 154, shown as charging control circuit 160. According to various embodiments, charging valve 144 and discharging valve 146 are communicable with processing circuit 154. In some embodiments, charging valve 144 and discharging valve 146 transmit monitored data (e.g., position, flow rate, pressure, etc.) to processing circuit 154. Charging control circuit 160 controls charging valve 144 and discharging valve 146 to selectively charge and discharge accumulator 114.

Memory 158 stores instructions for processing circuit 154. In some applications, memory 158 stores monitored data from a sensor, shown as pressure transducer 162. According to an exemplary embodiment, pressure transducer 162 determines a pressure of fluid in accumulator 114. However, pressure transducer 162 may determine a pressure of fluid in accumulator line 116 or common accumulator line 118. In various embodiments, the pressure of fluid in accumulator 114 is substantially equal to the pressure of fluid in accumulator line 116 and common accumulator line 118. Pressure transducer 162 may additionally or alternatively be a general sensor or a sensor array configured to obtain various measurements of fluid in accumulator 114 or fluid flowing through accumulator line 116 such as temperature, quality, flow rate (e.g., mass flow rate, volumetric flow rate, etc.), viscosity, and other similar quantities.

In one embodiment, controller 152 is configured to receive twenty-four Volt direct-current (DC) power. Controller 152 may be contained within or may be external to regulator 100. Similarly, controller 152 may be communicable with an external device such as a mobile device (e.g., cell phone, personal electronic device, etc.), a network (e.g., cloud network, computer network, etc.), or a computing device (e.g., computer, control station, etc.). For example, controller 152 may transmit an alert to personal electronic device of a user when pressure of the fluid in accumulator 114 has fallen below a target threshold. Alternatively, controller 152 may transmit substantially real-time data (e.g., pressure, amount of fluid in accumulator 114, etc.) to an external server when a blowout occurs.

Controller 152 may monitor the pressure of accumulator 114 via pressure transducer 162. The monitored pressure may relate to a flow rate of hydraulic fluid through reducing valve 108 and/or relief valve 110. By having access to monitored pressure data for accumulator 114, controller 152 is capable of comparing the monitored pressure to a desired position. For example, if the monitored pressure deviates an undesirable amount from the desired pressure, charging control circuit 160 may instruct discharging valve 146 to discharge fluid to vent line 106. Such a comparison by controller 152 may prevent excessive pressure spikes in accumulator 114 thereby increasing the life of regulator 100. Similarly, if pressure in accumulator 114 is below a threshold, as determined by pressure transducer 162, controller 152 may instruct charging valve 144 to open thus charging accumulator 114.

In various embodiments, controller 152 controls charging valve 144 and discharging valve 146 electronically. In alternative embodiments, controller 152 controls charging valve 144 and discharging valve 146 hydraulically or mechanically. In another alternative embodiment, controller 152 is replaced by manual controls for charging valve 144 and discharging valve 146. For example, an operator or ROV may open or close charging valve 144 and discharging valve 146 manually.

Regulator 100 may be configured to bolt-on or screw-in to a mounting location. Further, regulator 100 may be replaceable and/or serviceable by an ROV. For example, regulator 100 may be configured to be replaceable by an ROV with standard ROV stab technology (e.g., hot stab, etc.). Regulator 100 may also be installed as a network node.

According to various embodiments, reducing valve 108 is a normally closed valve and relief valve 110 is a normally closed valve. In an alternative embodiment, reducing valve 108 is a normally open valve. In another alternative embodiment, relief valve 110 is a normally open valve.

Accumulator 114 may be defined by a capacity of fluid. According to an exemplary embodiment, accumulator 114 is a metal-bellows type accumulator. However, accumulator 114 may be a tower accumulator, a raised weight accumulator, a compressed gas accumulator (e.g., compressed nitrogen accumulator, etc.), a gas-charged accumulator (e.g., nitrogen-charged accumulator, etc.), a spring type accumulator, a metal bellows type accumulator, or any other suitable hydraulic accumulator.

It is understood that regulator 100 may be implemented with various gas, fluid, and gas-fluid mixtures. For example, regulator 100 may be utilized with various BOP fluids such as Erifon BOP fluids (e.g., Erifon CLS, Erifon HD603HP, Erifon HD856, etc.). Similarly, it is understood that regulator 100 may be utilized in a variety of applications. For example, regulator 100 may be utilized in minimal-leak applications. In other examples, regulator 100 may be of a zero-leak design. Regulator 100 may have a relatively high flow coefficient ($C_V$) compared to conventional regulators.

Spring 126 and spring 128 may be coil springs, linear springs, and other similar resistance devices. In an alternative embodiment, spring 126 and spring 128 are adjustable resistance devices. For example, spring 126 and spring 128 may be electromagnetic resistance devices communicable with, and controllable by, controller 152.

According to various embodiments, regulator 100 and all associated components are constructed from Stellite (e.g., Stellite 6B, etc.). In other examples, regulator 100 and all associated components may be constructed from Nitronic® (e.g., Nitronic® 50, Nitronic® 60, etc.), steels, stainless steels (e.g., 316 stainless steel, etc.), steel alloys (e.g., wear resistant steel alloys, etc.), chromium alloys, cobalt alloys, copper alloys (e.g., brass, etc.), nickel alloys, ceramic materials, and other metals or metallic alloys. Regulator 100 and all associated components may be treated with wear-resistant coatings, sprays, and lubricants. Regulator 100 may include various internal seals (e.g., static seal, dynamic seals, etc.). For example, regulator 100 may include hydrogenated nitrile butadiene rubber seals.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

Although the FIGURES may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the FIGURES. It should be noted that the orientation of various elements may differ according to other exemplary embodiments, and that such variations are intended to be encompassed by the present disclosure.

The present invention is not limited to the particular methodology, protocols, and expression of design elements, etc., described herein and as such may vary. The terminology used herein is for the purpose of describing particular embodiments only, and is not intended to limit the scope of the present invention.

As used herein, the singular forms include the plural reference and vice versa unless the context clearly indicates otherwise. The term "or" is inclusive unless modified, for example, by "either." For brevity and clarity, a particular quantity of an item may be described or shown while the actual quantity of the item may differ. Other than in the operating examples, or where otherwise indicated, all numbers and reference characters expressing measurements used herein should be understood as modified in all instances by the term "about," allowing for ranges accepted in the art.

Unless defined otherwise, all technical terms used herein have the same meaning as those commonly understood to one of ordinary skill in the art to which this invention pertains. Although any known methods, devices, and materials may be used in the practice or testing of the invention, the methods, devices, and materials in this regard are described herein.

It should be understood that no claim element herein is to be construed under the provisions of 35 U.S.C. § 112(f), unless the element is expressly recited using the phrase "means for."

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in deposit to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

What is claimed:

1. A regulator comprising:
    a reducing valve operable between a closed position and an open position, the reducing valve comprising:
        a first opening inlet configured to receive fluid to bias the reducing valve towards the open position;
        a first closing inlet configured to receive fluid to bias the reducing valve towards the closed position; and
        a first spring configured to transmit a first spring force to the reducing valve to bias the reducing valve towards the closed position;
    an accumulator configured to store fluid at a first pressure;
    an accumulator line configured to receive fluid from the accumulator and to provide the fluid to the first opening inlet at the first pressure;
    a regulated line fluidly connected to the first closing inlet at a second pressure; and
    a relief valve operable between a closed position and an open position, the relief valve comprising:
        a second opening inlet configured to receive fluid to bias the relief valve towards the open position;
        a second closing inlet configured to receive fluid to bias the relief valve towards the closed position; and
        a second spring configured to transmit a second spring force to the relief valve to bias the relief valve towards the closed position;
    wherein the reducing valve transitions from the closed position to the open position when a first force created by the first pressure on the reducing valve is greater than a sum of the first spring force and a second force created by the second pressure on the reducing valve.

2. The regulator of claim 1, wherein the accumulator line is further configured to provide the fluid to the second closing inlet at the first pressure;
    wherein the regulated line is fluidly connected to the second opening inlet at the second pressure; and
    wherein the relief valve transitions from the closed position to the open position when a third force created by the second pressure on the relief valve is greater than a sum of the second spring force and a fourth force created by the second pressure on the relief valve.

3. The regulator of claim 1, wherein the reducing valve is configured to facilitate selective transmission of fluid from a supply line to the regulated line when the reducing valve is in the open position.

4. The regulator of claim 3, wherein the relief valve is configured to facilitate selective transmission of fluid from the regulated line to a vent line when the relief valve is in the open position.

5. The regulator of claim 4, further comprising:
    a charging line fluidly connected to the supply line and the accumulator line; and
    a charging valve disposed on the charging line, the charging valve operable between an open position where fluid is transmitted from the supply line to the accumulator line and a closed position where fluid is substantially prohibited from being transmitted from the supply line to the accumulator line.

6. The regulator of claim 5, further comprising:
    a discharging line fluidly connected to the vent line and the accumulator line; and
    a discharging valve disposed on the discharging line, the discharging valve operable between an open position where fluid is transmitted from the accumulator line to the vent line and a closed position where fluid is substantially prohibited from being transmitted from the accumulator line to the vent line.

7. The regulator of claim 6, further comprising:
    a pressure transducer fluidly disposed on the accumulator line, the pressure transducer configured to measure a pressure of the fluid in the accumulator, the pressure of the fluid in the accumulator substantially equal to the first pressure; and
    a controller communicable with the pressure transducer and configured to receive data from the pressure transducer, the data including the pressure of the fluid in the accumulator.

8. The regulator of claim 7, wherein the controller is communicable with the charging valve and the discharging valve;
    wherein the controller is configured to operate the regulator in a charging mode and a discharging mode;
    wherein the charging valve is open and the discharging valve is closed when the regulator is in the charging mode such that the accumulator is filled with fluid; and
    wherein the charging valve is closed and the discharging valve is open when the regulator is in the discharging mode such that the accumulator is emptied of fluid.

9. A regulator comprising:
    a reducing valve operable between a closed position and an open position, the reducing valve comprising:
        a first opening inlet configured to receive fluid to bias the reducing valve towards the open position;
        a first closing inlet configured to receive fluid to bias the reducing valve towards the closed position; and a first spring configured to transmit a first spring force to the reducing valve to bias the reducing valve towards the closed position;
an accumulator configured to store fluid at a first pressure;
an accumulator line configured to receive fluid from the accumulator and to provide the fluid to the first opening inlet at the first pressure;
a regulated line fluidly connected to the first closing inlet at a second pressure; and
a speed control network connected to the regulated line and to the first closing inlet, the speed control network comprising a first branch configured to facilitate transmission of fluid between the regulated line and the first closing inlet, the first branch including a constriction configured to reduce a flow rate of fluid through the constriction;
wherein the reducing valve transitions from the closed position to the open position when a first force created by the first pressure on the reducing valve is greater than a sum of the first spring force and a second force created by the second pressure on the reducing valve.

10. The regulator of claim 9, wherein the speed control network further comprises a second branch configured to facilitate transmission of fluid between the regulated line and the first closing inlet, the second branch including a check valve configured to facilitate transmission of fluid from the regulated line to the first closing inlet, the check valve additionally configured to substantially prohibit transmission of fluid from the first closing inlet to the regulated line.

* * * * *